No. 867,628. PATENTED OCT. 8, 1907.
E. S. WILLIAMSON.
PIPE COUPLING.
APPLICATION FILED APR. 25, 1906.
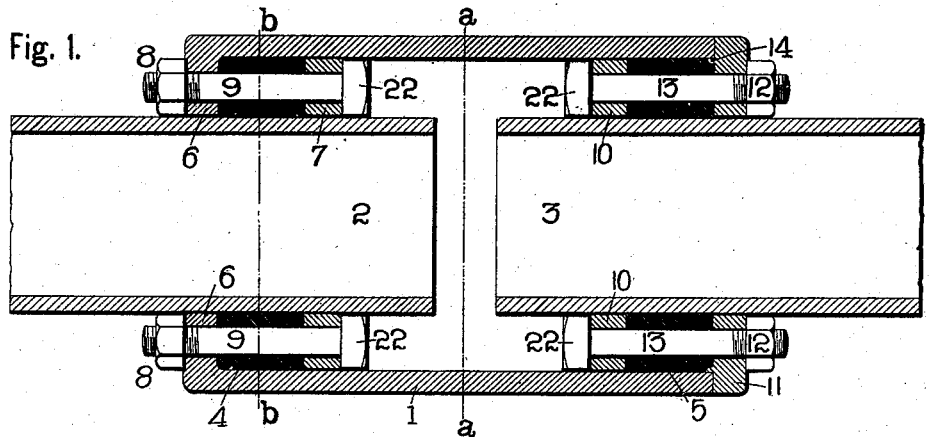
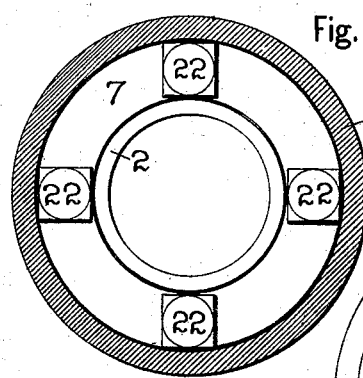
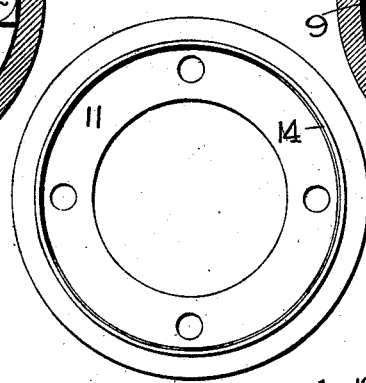
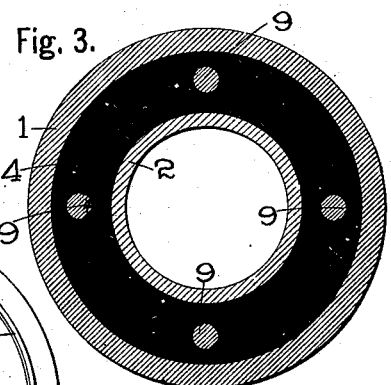
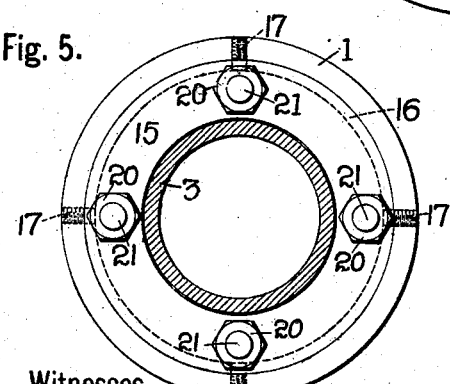
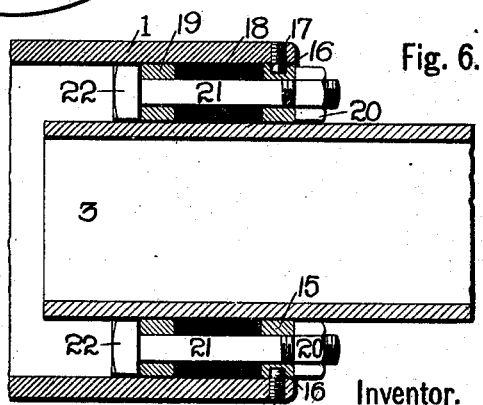
Witnesses.
L. M. Sangster
Geo. A. Neubauer
Inventor.
Eli S. Williamson.
By C. J. Sangster Attorney.

UNITED STATES PATENT OFFICE.

ELI S. WILLIAMSON, OF BUFFALO, NEW YORK.

PIPE-COUPLING.

No. 867,628. Specification of Letters Patent. Patented Oct. 8, 1907.

Application filed April 25, 1906. Serial No. 313,620.

*To all whom it may concern:*

Be it known that I, ELI S. WILLIAMSON, a citizen of the United States, residing at Buffalo, in the county of Erie and State of New York, have invented a certain new and useful Improvement in Pipe-Couplings, of which the following is a specification.

This invention relates to an improved coupling for pipes or the like.

The object of the invention is to provide a simple, cheap, durable and easily fitted means for connecting the ends of adjacent pipes which will be both liquid and gas tight.

The invention also relates to certain details of construction all of which will be fully and clearly hereinafter described and claimed reference being had to the accompanying drawings in which,—

Figure 1, is a central longitudinal section through the improved pipe coupling and the adjacent ends of two pipes showing the coupling in place. Fig. 2, is a transverse section on line $a-a$, Fig. 1. Fig. 3, is a transverse section on line $b-b$, Fig. 1. Fig. 4, is a detached inner view of the end ring. Fig. 5, is an end elevation of another form of coupling showing a transverse section through one of the pipes. Fig. 6, is a central longitudinal section through one half of the modified form of coupling in position upon one end of a pipe.

In referring to the drawings in detail like numerals designate like parts.

The invention comprises a sleeve 1, that fits loosely over the adjacent ends of the pipes 2 and 3, to be connected and two friction locking and sealing mechanisms each of which is interposed between the sleeve and one of the pipes. The friction locking and sealing mechanisms consist of the rims 4 and 5, of rubber or like yielding material which are capable of yielding under pressure to change their form and means for expanding said rings within the sleeve and also contracting the rings upon the pipe ends. The rubber rings are preferably considerably wider than they are thick and of a rectangular form in cross section so that when expanded they will bear with practically equal pressure against all points.

The sleeve 1, is provided at one end with an inwardly extending flange 6, formed integral with the sleeve which has a series of holes or openings for the passage of bolts and the ring 4, is fitted in the sleeve and against the inner surface of the flange 6.

A metal ring 7, is placed around the pipe 2, and within the sleeve 1, against the inner surface of the ring 4, and is drawn against the same by tightening the nuts 8, upon the screw bolts 9, fitted through openings in the metal ring 7, and the flange 6. The ring 5, is located within the opposite end of the sleeve and around the pipe 3, and is expanded between an inner metal ring 10, and an outer metal ring 11, which is fitted upon the end of the sleeve by tightening the nuts 12, upon bolts 13, fitted through openings in the inner and outer metal rings 10 and 11 and the ring 5.

The outer metal ring 11, is provided on one of its faces with a comparatively small circular flange 14, which projects within the end of the sleeve when the ring is fitted in place to center the ring with respect to the sleeve.

The bolts 9, extend approximately parallel with the sleeve 1, and the connected pipes, so that the compression of the rubber rings will be practically equal at all points to prevent uneven wearing of the rings.

In the modified form shown in Figs. 5 and 6, a metal ring 15, provided with a peripheral groove 16, is fitted within the end of the sleeve and is fastened in place by set screws 17 in the sleeve which have their inner ends projecting into the groove 16. The expansible ring 18, is similar to the ring 5, and is expanded by compression between the ring 15, and an inner metal ring 19, similar to the ring 10; the two rings 15 and 19, being drawn together by tightening the nuts 20, upon bolts 21, extending through the rings 15 and 19, and the expansible ring 18. The compressing bolts 9, 13, and 21, are provided with heads 22, of square or equivalent form which are fitted unrotatably between the sleeve and the pipe ends.

This improved coupling is very easily and quickly attached in place by fitting it upon the pipe ends and tightening the nuts upon the bolts thereby expanding the rings of rubber or like yielding material tightly within the sleeve and also contracting said rings tight around the pipe ends and upon that portion of the bolt shanks passing through the yielding rings. The inclosing sleeve is practically a straight cylindrical tube and sufficiently larger than the pipes to leave an annular space for the rubber rings. The inner circular wall of the sleeve which is of equal size throughout and the outer circular walls of the pipes are concentric and the inner and outer surfaces of the rubber rings 1, are in contact with the outer surfaces of the pipes and the inner surfaces of the sleeve throughout their width. The flat sides of the rubber rings are in contact with and embraced between the annular metal rings. Owing to the rectangular cross sectional form of the rubber rings and the extending of the clamping bolts parallel with the sleeve, the tightening of the bolts will draw the metal surfaces or rings between which the rubber rings are embraced toward each other in a direction parallel with the sleeve and expand the rubber rings within the sleeve and contact them around the pipes with practically equal pressure at all points. This not only forms a long joint of equal tightness throughout but also insures long life for the packing which is of vital importance. The coupling not only firmly secures the pipe ends together but it also forms a sealed connection which is both gas and liquid tight.

As the sleeve flange, the ring and the inner and outer rings are fitted fairly loosely upon the pipes, the connection is not absolutely rigid but will yield sufficiently to provide for the expansion and contraction of the pipes under influence of heat or cold and also permit a slight lateral movement of the pipes without disturbing the tightness of the connection.

The great advantage of this construction is that the rubber rings are nearly entirely inclosed and protected from the deteriorating influence of the oil, gas, or other liquid or gaseous medium passing through the pipe and are expanded into contact with the sleeve and pipe ends with practically equal pressure by reason of the rectangular cross sectional shape of the rubber rings and the longitudinal parallelism of the tightening bolts with the sleeve and pipe ends.

I claim as my invention.

1. In a coupling for pipes, pipes having their ends in juxtaposition, a straight cylindrical sleeve around said pipe ends and a friction locking and sealing mechanism between the sleeve and each pipe end each comprising a rubber ring of rectangular cross section, annular metal surfaces on opposite sides of each rubber ring, and screw bolts extending parallel with the sleeve and passing through the metal and rubber rings whereby each rubber ring is expanded equally and evenly, substantially as set forth.

2. In a coupling for pipes, pipes having their ends in juxtaposition, a straight cylindrical sleeve around said pipe ends having an inwardly projecting flange at one end, a ring of yielding material within the sleeve and interposed between the sleeve and one of the pipe ends; said ring being of rectangular cross section and considerably wider than it is thick, an inner metal ring between which and the flange of the sleeve the yielding ring is located; said yielding ring being approximately inclosed and protected by the sleeve pipe end inner metal ring and sleeve flange, bolts extending parallel to the sleeve and pipe end and passing through the inner metal ring, yielding ring and sleeve flange, screw nuts on the outer ends of the bolts, a similar rectangular cross sectional yielding ring interposed between the sleeve and another pipe end, inner and outer metal rings between which said last mentioned yielding ring is located and approximately inclosed bolts extending parallel to the sleeve and pipe end and passing through the inner and outer metal rings and the yielding ring and screw nuts on the outer ends of said bolts, substantially as set forth.

3. In a coupling for pipes, pipes having their ends in juxtaposition, a straight cylindrical sleeve around said pipe ends, a plurality of yielding rings each of said rings being of rectangular cross section and considerably wider than it is thick, one being interposed between the sleeve and each of the pipe ends; means for expanding the yielding rings, to frictionally lock and seal the pipe ends to the sleeve comprising annular metal elements having flat surfaces between which the yielding rings are embraced and bolts for drawing said metal elements toward each other to equally and evenly expand the yielding rings.

4. In a coupling for pipes, pipes having their ends in juxtaposition, a straight cylindrical sleeve around said pipe ends, a plurality of yielding rings one being interposed between the sleeve and each of the pipe ends; means for expanding the yielding rings, to frictionally lock and seal the pipe ends to the sleeves comprising annular metal elements having flat surfaces between which the yielding rings, are located and approximately inclosed and protected and screw bolts extending parallel with the sleeve and through the annular metal surfaces and yielding rings for drawing said surfaces together equally and evenly expanding the yielding rings, substantially as set forth.

5. In a coupling for pipes, pipes having their ends in juxtaposition, a straight cylindrical sleeve around said pipe ends having an inwardly projecting flange at one end, a ring of yielding material within the sleeve and interposed between the sleeve and one of the pipe ends; said ring being of rectangular cross section and considerably wider than it is thick, an inner metal ring between which and the flange of the sleeve the yielding ring is located; said yielding ring being approximately inclosed and protected by the sleeve pipe end, inner metal ring and sleeve flange, bolts extending parallel to the sleeve and pipe end and passing through the inner metal ring, yielding ring and sleeve flange, screw nuts on the outer ends of the bolts, a similar rectangular cross sectional yielding ring interposed between the sleeve and another pipe end, inner and outer metal rings between which said last mentioned yielding ring is located and approximately inclosed, a flange on one of said metal rings for centering said ring in the sleeve, bolts extending parallel to the sleeve and pipe end and passing through the inner and outer metal rings and the yielding ring and screw nuts on the outer ends of said bolts, substantially as set forth.

ELI S. WILLIAMSON.

Witnesses:
L. M. SANGSTER,
GEO. A. NEUBAUER.